INVENTOR.
ROLAND B. CALDWELL

Nov. 11, 1969     R. B. CALDWELL     3,477,498

LIQUID FLOW CONTROL VALVE MECHANISM

Filed Aug. 4, 1967     2 Sheets-Sheet 2

INVENTOR.
ROLAND B. CALDWELL
BY
*Yount, Raney, Flynn and Tarolli*
ATTORNEYS

United States Patent Office 3,477,498
Patented Nov. 11, 1969

3,477,498
LIQUID FLOW CONTROL VALVE
MECHANISM
Roland B. Caldwell, Columbus, Ohio, assignor to Ranco
Incorporated, Columbus, Ohio, a corporation of Ohio
Filed Aug. 4, 1967, Ser. No. 658,497
Int. Cl. G05d 16/00; F17d 3/00
U.S. Cl. 165—38          9 Claims

ABSTRACT OF THE DISCLOSURE

A heating system for an automobile interior comprising a closed liquid circulating circuit for circulating heated liquid from the cooling jacket of the engine through an air heater core, the passage of liquid to the heater being controlled by a valve mechanism in the circuit between the engine and the heater and comprising a valve chamber to receive the liquid and a movable valve member in the chamber for regulating the flow of liquid to the heater, a liquid flow bypass being provided from the chamber around the heater and back to the engine, pressure responsive valve means being provided to divert liquid from the chamber through the bypass to limit the liquid pressure in the chamber, and the movable valve member is effective to block the liquid entrance to the chamber when the member is positioned to materially throttle the flow of liquid from the chamber to the heater. The valve mechanism includes a low capacity flow bypass downstream of the throttling valve and around the heater so that the total flow through the throttling valve opening is substantially greater than the flow through the heater, thereby minimizing clogging of the valve parts in their throttling position.

The present invention relates to improvements in liquid flow control valves adapted to provide relatively constant selected volumes of flow of liquid through a flow circuit in which the pressure of the liquid in the circuit varies throughout a considerable range. The invention is particularly useful in valves for controlling the flow of heated liquid of an internal combustion engine cooling system through a heater core for heating the interior of the passenger compartment of an automobile.

It has been the practice to heat the interior of a passenger compartment of an automobile and the like by circulating the heated liquid from the cooling system of the engine for the automobile through a heater core arranged in a heating system in which air is passed through the heater core to absorb heat from the heated liquid passing therethrough, the heated air being discharged into the passenger compartment. It is desirable to regulate the flow of heated fluid through the heater core by a valve mechanism which can be manually adjustable to regulate the temperature of the air discharging from the heater core and thereby regulate the temperature inside the passenger compartment. Because the liquid is circulated by a pump driven by the automobile engine the pressure and rate at which the liquid is circulated through the heater core varies according to changes in speed of the engine and the heat output of the heater core therefore varies widely and results in over and underheating and, for that reason, this type of control has proved to be unsatisfactory. In addition, present day cooling systems for automobile internal combustion engines are usually operated at relatively high pressures which present problems in providing valves which are unaffected by these pressures, particularly where the valve is actuated by a thermally responsive element.

Another difficulty encountered in controlling the flow of liquid in automobile heater systems is that particles of matter in the systems tend to clog the valve parts when the valves are throttled to provide a relatively low rate of flow in the system and therefore the valves are ineffective.

The principle object of the present invention is the provision of a new and improved regulatable liquid flow control valve for liquid flow systems of the type mentioned, and which is adapted to provide a substantially constant rate of flow of liquid through a portion of the system in accordance with a particular setting of the valve irrespective of changes in pressure of the liquid tending to flow through the valve.

Another important object of the invention is the provision of a new and improved valve mechanism of the character mentioned which is adapted to be located upstream from a section of the system through which the flow is to be regulated and which mechanism bypasses a portion of the liquid leaving the valve around the aforementioned section of the system so that the extent of opening of the valve parts for a given volume or rate of flow through the section is appreciably greater than that for providing the rate of flow which actually passes through the section, thereby minimizing the chance of the valve parts becoming clogged by dirt, etc. during setting of the valve mechanism for low rates of flow.

A further object of the invention is the provision of a new and improved heater system for an internal combustion engine driven vehicle and the like, comprising a valve mechanism for controlling the flow of liquid through a heater core in the system, which valve mechanism includes liquid pressure responsive means for bypassing liquid around the heater core and thereby maintain a predetermined minimum pressure against regulatable valve means which is effective to control the flow of liquid through the heater core.

A still further object of the invention is the provision of a new and improved liquid flow control valve mechanism of the type mentioned in which a movable member is operative within a valve chamber to control valve means to modulate the flow of liquid from the valve chamber, and which mechanism includes means tending to restrict flow of the liquid into the valve chamber when the movable member is in the lower flow valve setting and permitting free flow of liquid into the valve chamber when the movable member is set to effect relatively high liquid flow from the chamber.

Other objects and advantages of the invention will be apparent from the following description of a preferred form thereof, reference being made to the accompanying drawings wherein.

Figure 1:
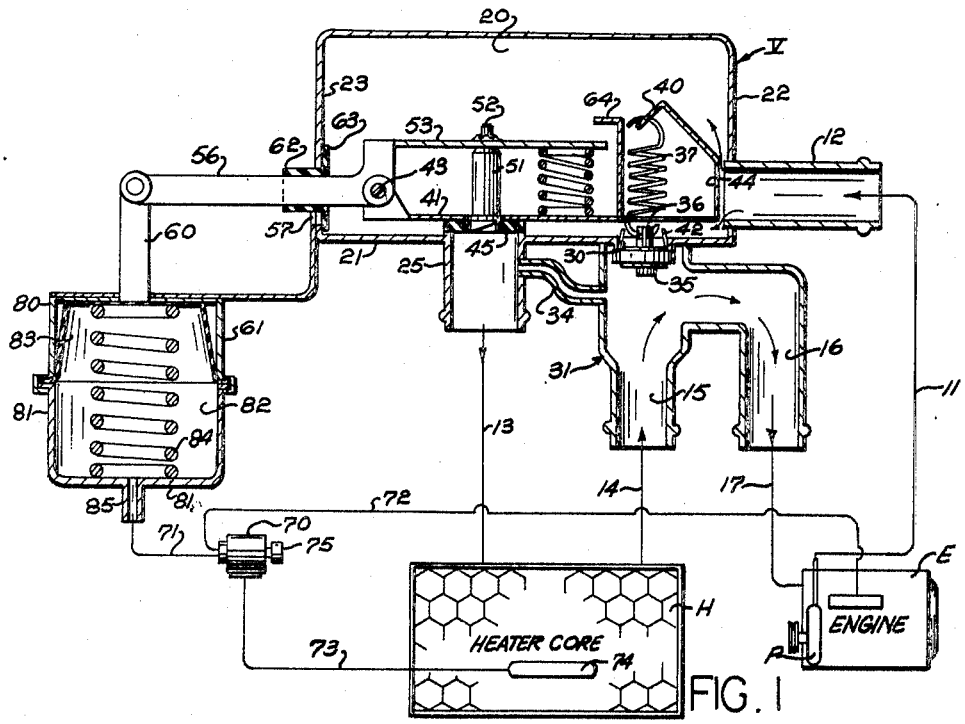
FIG. 1 is a sectional schematic view of a liquid flow control valve mechanism in a heating system embodying the invention for an internal combustion engine driven passenger car.
Figure 2:
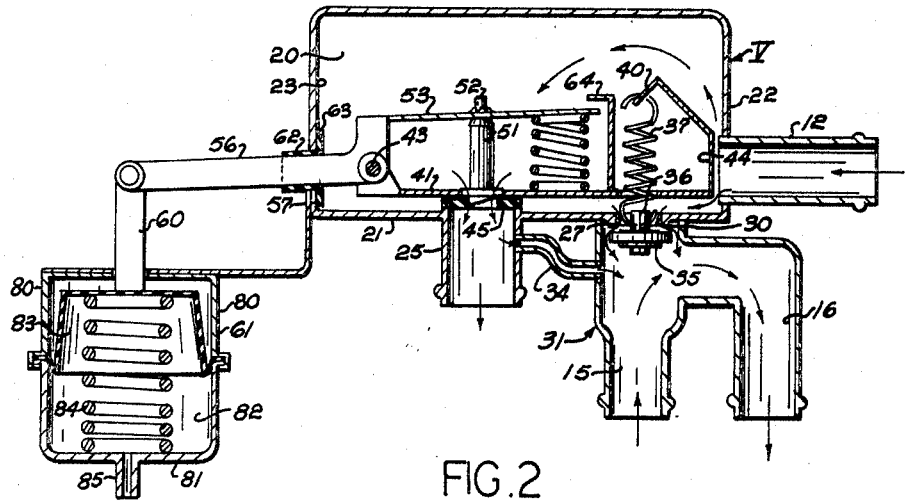
FIGS. 2 and 3 are views of the liquid flow control valve mechanism shown in FIG. 1 showing certain parts thereof in different positions.

Referring to the drawings, the invention is shown embodied in a heating system for an internal combustion engine driven passenger automobile not shown, which includes an engine E. The engine E has a conventional liquid cooling system which includes a water jacket around the cylinders, and a pump P circulates heated water or other suitable liquid coolant from the jacket through a radiator for cooling the liquid, but for the sake of simplicity, is not shown. The pump P is also adapted to pump coolant through a heater core H to effect heat exchange with air directed into the passenger compartment. For this purpose, the discharge of the pump P is connected by a conduit 11 to the inlet connector 12 of a liquid flow control valve mechanism V. The valve mechanism V is adapted to control the flow of liquid from the pump P to the heater core H by way of a conduit 13. The liquid is returned to the engine cooling jacket from the heater through a conduit 14 leading to branch conduits 15, 16 of the valve V, and through a conduit 17 to the engine.

The valve mechanism V includes a chamber 20 formed by a housing structure which includes a bottom wall 21 and end walls 22, 23. The end wall 22 has an opening therethrough in which the inlet 12 in the form of a tubular connector is received and which is sealingly attached to the wall about the opening as by brazing. The bottom wall 21 has an outlet opening therein in which a tubular outlet connector 25 is suitably secured and which provides a convenient connection with the conduit 13 leading to the heater core H. An end portion of the connector 25 extends into the chamber 20 and forms a flat annular valve seat 26.

The wall 21 of chamber 20 has a second outlet opening 27 therein and an annular ridge 30 is formed about the opening on the exterior of the wall for providing a valve seat. The opening 27 is surrounded by one end of a tubular connector member 31 which includes a necked portion 32 which is attached to the wall 21 about the opening 27, as by brazing, and the connector includes the branch connectors 15, 16.

A bypass tube 34 interconnects the outlet connector member 25 with the connector member 31 to form a relatively small liquid passage between the two members, the purpose of which is explained more fully hereinafter.

It will be appreciated that liquid passing from chamber 20 into the outlet connector 25 may flow through the heater core H and is returned to the cooling jacket of the engine E by way of the conduit 13, connector member 31, and conduit 17. Also, liquid may pass from the chamber 20 through the opening 27, connector member 31, and conduit 17 to the engine and thereby bypass the heater core H.

The liquid pressure within chamber 20 is adapted to be regulated so that it is maintained below predetermined relatively low pressures, and this is accomplished by providing a valve member 35 which is adapted to close on the valve seat 30 when a pressure differential between the liquid in the chamber 20 and in the member 31 is below ½ lb. to lbs./sq. in., for example, and to move from the port or seat when the pressure becomes in excess of ½ lb. to lbs./sq. in. so that liquid is returned to the engine and thereby relieves the pressure in the chamber. The valve member 35 is of a suitable poppet construction including a stem 36 having an opening which receives one end of a tension spring 37, the opposite end of which is hooked to a finger 40 of a control lever 41. The poppet member 35 also includes guide fingers, two of which appear at 42, which enter the opening 27 and cooperate with the edges thereof to guide the valve relative to the seat 30. The tension of spring 37 as well as the rate thereof, is such that the valve member 35 is moved from the seat 27 when the pressure differential on opposite sides of the poppet valve attain approximately values just mentioned throughout the variation in length of the spring.

The lever 41 is pivoted in the chamber 20 on a pin 43 which is suitably supported in the chamber, and the unpivoted end of the arm extends generally towards the end wall 22. An upstanding or turned portion 44 of the arm 41 is adapted to extend transversely of the inner opening of the connector 12 and tends to block the opening and restrict flow of liquid into the chamber 20 when the arm is in the position shown in FIG. 1. The portion 44 of the arm 41 terminates in the finger portion 40.

Figure 4:
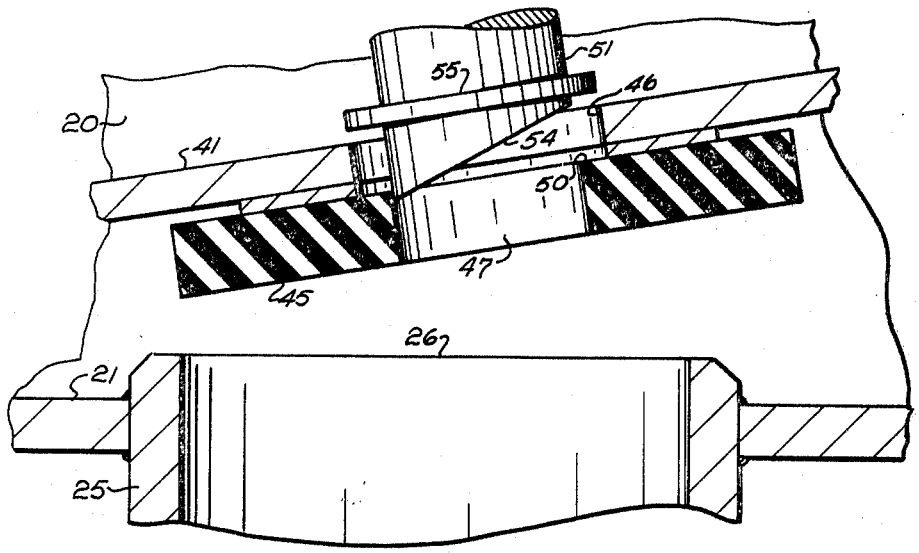
FIG. 4 is a fragmentary sectional view of a part of the valve mechanism shown in FIG. 3 and taken substantially on line 4 thereof.

An annular valve member 45 is suitably attached to the underside of the arm 41 in a position so as to close on the valve seat 26 when the arm is in its lowered position, as seen in FIG. 1. The arm 41 has an opening 46 therethrough which is in registration with the opening 47, which is slightly larger than the opening 46 so as to form annular shoulder 50 about the opening 47, see FIG. 4.

The opening 47 is adapted to permit a relatively low or intermediate flow of liquid from the chamber into the outlet connector 25. The flow of liquid through the opening 47 is regulated by a valve member 51 which is formed of a cylindrical body having a neck portion 52 attached in an opening through an operating lever 53. The opposite end of the member 51 is cut so as to lie in a plane extending at less than 90° to the axis of the member and forms a surface 54 which is adapted to enter the opening 47 on a slope relative to the plane of the upper edges of the opening during movement of the valve member 51 relative to the valve member 45, as is explained more fully hereinafter.

The operating lever 53 is adapted to be swung about the pivot pin 43, on which it is suitably mounted, and the lever has an end portion 56 which extends through an opening 57 in the end wall 23 of the chamber 20 and is attached to a plunger 60 of a pnuematic motor 61. A rubber sleeve 62 surrounds the portion 56 of the lever 53, and which sleeve has a flange 63 secured to the inside of the wall 23 in a manner to prevent leakage of liquid from the chamber 20 through the opening 57 while permitting swinging of the operating lever about its axis. Operating lever 53 is adapted to move relative to the arm 41 and an abutment 64 which is integral with the arm 41 and which overlies the outer end of the operating lever. A compression spring 65 is interposed between the arm 41 and lever 53 to continually urge the operating lever to the abutment 64.

When the operating lever 53 is in its valve closing position, as shown in FIG. 1, the arm 41 is in a position in which it closes the valve member 45 on the seat 26, and the flange 55 of valve number 51 engages the annular shoulder 50 to seal the passage 47 through the valve number 45. Thus, no liquid will flow to the heater core H. The portion 44 of the arm 41 is extended across the entire opening of the inlet formed by the connector 12 so that the force of the liquid entering the chamber 20 is more or less dissipated.

If it is desired to have a relatively low heating of the air passing through the heater core H, the operating lever 53 is moved counter-clockwise about its pivot 43 and its initial movement which will be away from the arm 41, removes the flange 55 from the annular seat 50 and a portion of the end surface 54 of the valve member 51 is moved above the plane of the opening at the shoulder 50 so as to permit a relatively low volume of liquid to pass through the opening 47 into the discharge connector 25 for passage to the heater H. As the lever 53 is moved further counter-clockwise, the flow opening through the passage 47 is gradually increased until the valve member 51 is removed therefrom. Further movement of the operative lever 53 in the direction mentioned causes the free end thereof to engage the abutment 64 which commences to lift the arm 41 and gradually remove the valve member 45 from the seat 26. As the valve member 45 is removed further from the seat 26, the portion 44 of arm 41 is gradually removed from its blocking position with respect to the inlet formed by the connector 12, so that a relatively high flow of liquid may enter the chamber 20 and pass therethrough to the heater core H.

Figure 3:
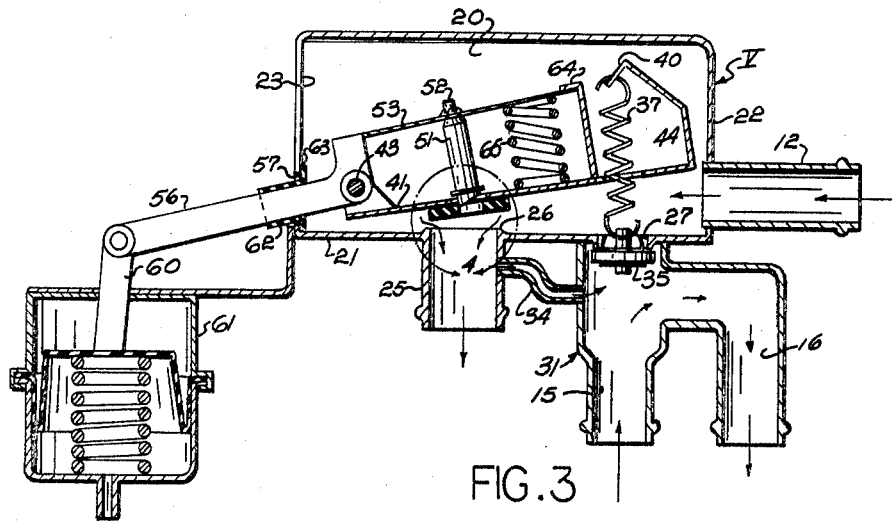

It will be seen in FIG. 3 that as the lever 53 is moved to increase the flow through the valve 25, the tension of the spring 37 is increased thereby raising the pressure differential at which the valve 35 is opened. This increases the flow rate through the valve 45 to provide adequate heat exchange when the valve is set to provide maximum or a relatively high degree of heating.

In some internal combustion engine cooling systems, particulate materials are used to prevent leakage in the system and which material tends to block small passages in the valve mechanisms. The purpose of the bypass tube 34 is to permit a relatively wide opening of the valve parts 54, 51, 26, 54, so that a substantially greater flow of liquid occurs through the seat 26 than actually flows through the heater core H, and consequently, a relatively low volume of liquid is circulated through the heater without a correspondingly small opening of the valve parts thereby eliminating clogging of the valve parts.

In view of the fact that the valve 35 permits relief flow of liquid from the chamber 20 upon an increase in pressure in fluid entering the chamber, the rate of flow of liquid through the valve seat 26 to the heater core will remain relatively constant at various valve settings, although the speed of the pump P may vary throughout a wide range as the speed of the engine varies during changes in driving conditions.

The operating lever 53 can be positioned about its pivot by any suitable means including manual manipulation or by automatic positioning by a power element, such as a thermostat; however, in the present instance, the operating lever is actuated by the plunger 60 of a vacuum motor 61. The operation of the motor 61 is controlled by a vacuum regulator 70 which is responsive to the temperature of air discharged from the heater core H. The vacuum regulator 70 may be similar to that disclosed in United States patent application Ser. No. 602,-102, and it includes a vacuum output conduit 71 in which a vacuum is produced which has a pressure which varies in accordance with the temperature of the air discharged from the heater core. The regulator 70 is connected to a source of raw or variable vacuum present in the intake manifold of the engine E through a conduit 72. A thermostatic element in the regulator 70 includes a capillary tube 73 and a bulb 74 which is filled with a suitable thermally responsive fluid which expands and contracts in accordance with increases and decreases in temperature thereof. The regulator 70 includes an adjusting knob 75 which may be located in the passenger compartment convenient to the operator so that the regulator can be adjusted to vary the temperature of the air discharged from the heater core.

Vacuum motor 60 may be of a conventional form comprising two cup-shaped members 80, 81 which are joined together at their open edges to form a cylindrical chamber 82, as shown. A cup-shaped rubber diaphragm 83 is secured inside the chamber 82 with the rim thereof hermetically joined to the adjoining portions of the rims of the cups 80, 81. A compression spring 84 inside the chamber 82 urges the diaphragm 83 upwardly towards the position shown in FIG. 1. The end wall of cup 80 is open to atmosphere and the end wall of cup 81 has a nipple 85 which receives one end of the conduit 71 so that more or less of a vacuum may be produced in the portion of the chamber 82 below the diaphragm. The diaphragm 83 has the plunger 60 suitably attached thereto, and as a vacuum is produced within the portion of the chamber 82 closed by the diaphragm 83, as described hereinafter, atmospheric pressure entering the upper portion of the chamber 82 forces the diaphragm 83 down until the atmospheric pressure and the spring pressure balance. This positions the operating lever 53 according to the requirements for liquid flow through the heater core H as sensed by the bulb 74. As the temperature of the discharged air decreases from a given value, the regulator 70 operates to increase the vacuum and thereby cause the operating lever 53 to be moved to a greater degree about its pivot 43 counterclockwise. This action, as described heretofore, increases the flow of liquid through the heater core.

As the temperature at the bulb 74 increases, the vacuum within the chamber 82 decreases causing the spring 84 to shift the operating lever 53 clockwise about its pivot.

It will be seen that by controlling the limits of the liquid pressure in the chamber 20, the pressures which affect operation of the valve members 45, 51 are relatively low and consistent for the various positions of the valve operating lever 53 so that the vacuum motor 61 actuates the operating lever consistently in response to the vacuum produced in the chamber 82 which corresponds to the temperature requirements to satisfy at the bulb 74.

A relatively wide range of flow rates through the heater core may be obtained by the particular form of the valve surface 54 cooperating with the valve passage formed through the valve member 45 and the fact that the valve 45 may be raised from its seat to produce a maximum flow. The bypass around the heater effects a relatively low rate of flow of liquid through the heater core although the valve 52 is open a sufficiently wide distance to avoid clogging by dirt, grit, etc. The flow of liquid through the valve mechanism effected by the bypass is sufficient to minimize the effect of heat losses from the flow circuit and thereby provide adequate heat exchange with the air passed through the heater core.

It is apparent that the invention provides valve means which accurately controls the flow of fluid over a wide range of rate of flow and is not adversely affected by changes in fluid pressure or usual particles of dirt, etc. in the system.

While but one form of the invention has been shown and described, it is apparent that other forms, modifications, and adaptations thereof may be adapted.

Having described my invention, I claim:

1. In a heat exchange apparatus comprising a closed liquid circulating system including tempering means to temper liquid in one portion of said system and a heat exchange unit for effecting heat exchange between the tempered liquid in said system and a medium external to said system, means creating a liquid pressure differential in said system on opposite sides of said unit to effect circulation of liquid through said system, valve means in said system between said tempering means and said unit and including a valve chamber connected with said tempering means to receive liquid therefrom and connected with said unit to direct a maximum flow of liquid to said unit, said valve means including a movable valve member to regulate the flow of liquid to said unit from said chamber, means forming a liquid flow passage from the downstream side of said valve means and around said unit to said source, the flow capacity of said flow passage being substantially less than said maximum flow of liquid, and means to divert liquid from said chamber around said unit and to said tempering means in response to an increase in liquid pressure differential in said system beyond a predetermned pressure differential.

2. A heat exchange apparatus as defined in claim 1 further characterized by the last mentioned means being effective to increase said liquid pressure differential as said movable valve member is moved to increase the flow of liquid to said unit.

3. A valve mechanism comprising means forming a chamber having a fluid inlet and two fluid outlets spaced apart, first valve means at a first one of said outlets and having a member movable for throttling the flow of fluid through said first outlet from a full flow to zero flow, fluid blocking means operatively associated with said movable member and being movable into positions partially blocking said fluid inlet when said member is moved into positions throttling the flow of fluid through said first outlet and said blocking means being movable from said partial fluid flow blocking positions when said member is moved to said full flow position, and normally closed second valve means responsive to a predetermined fluid pressure in said chamber for opening to permit flow through the second of said outlets.

4. A valve mechanism as defined in claim 3 further characterized by the last mentioned means being effective to increase said liquid pressure differential as said movable valve member is moved to increase the flow of fluid to said unit.

5. A valve mechanism as set forth in claim 3 further characterized by means forming an open passage from the downstream side of said first outlet to the downstream side of said second outlet and said second valve means.

6. A valve mechanism as set forth in claim 5 including valve means in said first outlet and downstream of said passage, the last mentioned valve means being effective to partially block said first outlet when said member is in its throttling position and to be ineffective to block said first outlet when said member is moved to a relatively full flow position.

7. In a heat exchange apparatus comprising a closed liquid circulating system including tempering means to temper liquid in one portion of said system and a heat exchange unit for effecting heat exchange between the tempered liquid in said system and a medium external to said system, means creating a liquid pressure differential in said system on opposite sides of said unit to effect circulation of liquid through said system, valve means in said system between said tempering means and said unit and including a valve chamber connected with said tempering means to receive liquid therefrom and connected with said unit to direct a maximum flow of liquid to said unit, said valve means including a movable valve member to regulate the flow of liquid to said unit from said chamber, and means to divert liquid from said chamber around said unit and to said tempering means in response to an increase in liquid pressure differential in said system beyond a pressure differential which is increased in response to an increase in opening of said valve means.

8. In a fluid circulating system including a fluid source and a unit arranged to receive fluid from said source, a valve mechanism between said source and said unit and comprising means forming a chamber having a fluid inlet and first and second fluid outlets spaced apart, said first outlet being connected with the fluid inlet of said unit, means forming a fluid bypass from said second outlet around said unit to said source, first valve means at said first outlet and having a member movable for throttling the flow of fluid from a full flow through said first outlet, fluid blocking means associated with said movable member and operative to at least partially block said fluid inlet when said member is in position to throttle the flow of fluid through said first outlet, said blocking means being movable from fluid blocking position when said member is moved to said full flow position, and normally closed second valve means responsive to a predetermined fluid pressure in said chamber for opening to permit flow through said second outlet.

9. In a fluid circulating system as defined in claim 8 further characterized by means to increase the fluid pressure in said chamber to which said second valve means responds to open.

References Cited

UNITED STATES PATENTS

| | | | |
|---|---|---|---|
| 2,192,327 | 3/1940 | Palmer | 251—120 XR |
| 2,741,266 | 4/1956 | Grayson | 137—614.11 XR |
| 2,354,362 | 7/1944 | Burns | 165—38 |
| 2,392,214 | 1/1946 | Cruzan | 165—38 XR |
| 2,560,245 | 7/1951 | Ramsaur et al. | 165—38 |
| 2,584,877 | 2/1952 | Hoffman et al. | 165—38 XR |
| 3,353,590 | 11/1967 | Holman | 165—35 |

FRED C. MATTERN, Jr., Primary Examiner

MANUEL ANTONAKAS, Assistant Examiner

U.S. Cl. X.R.

137—614.11